(No Model.) 4 Sheets—Sheet 2.

G. BLAKISTONE.
CAR FENDER.

No. 536,999. Patented Apr. 9, 1895.

(No Model.) 4 Sheets—Sheet 3.
G. BLAKISTONE.
CAR FENDER.
No. 536,999. Patented Apr. 9, 1895.
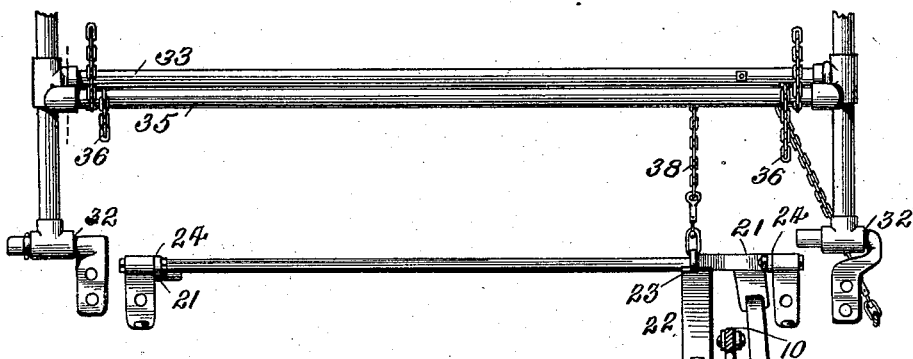
Fig. 3
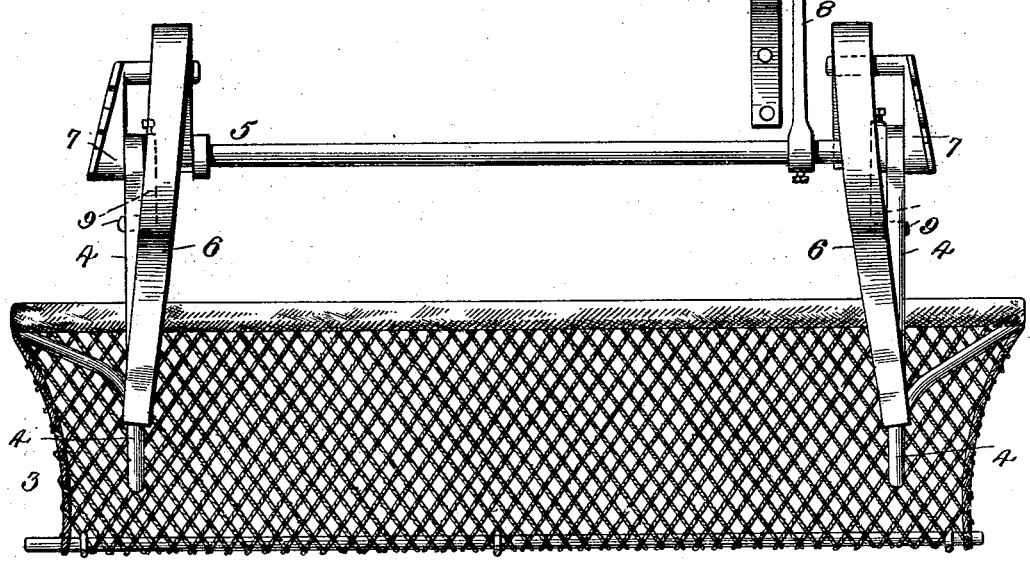
Fig. 4.
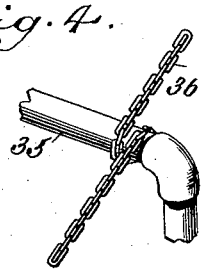
Witnesses
John Tomine
H. MacCarthy
George Blakistone
Inventor
By
Price & Stewart
Attorneys (No Model.) 4 Sheets—Sheet 4.
G. BLAKISTONE.
CAR FENDER.
No. 536,999. Patented Apr. 9, 1895.
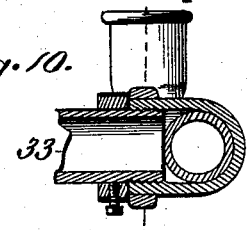
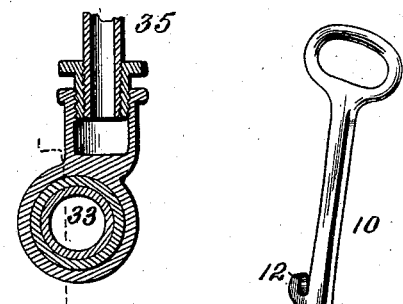
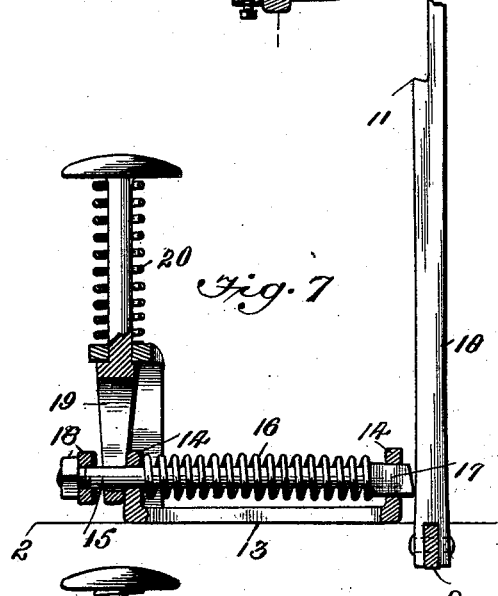
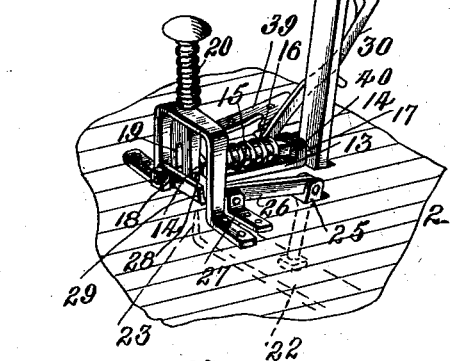
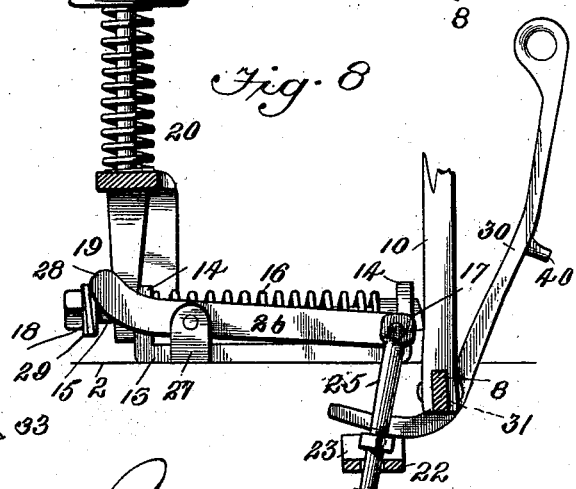
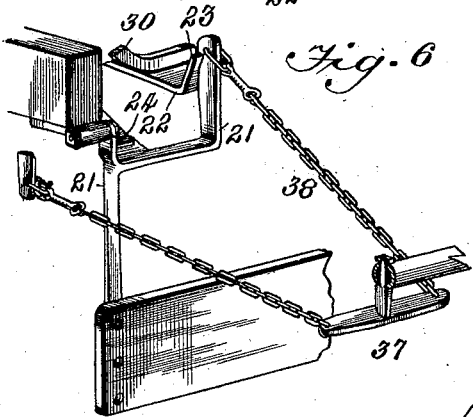
Witnesses
George Blakistone
Inventor
By
Price & Stewart
Attorneys

UNITED STATES PATENT OFFICE.

GEORGE BLAKISTONE, OF BALTIMORE, MARYLAND.

CAR-FENDER.

SPECIFICATION forming part of Letters Patent No. 536,999, dated April 9, 1895.

Application filed October 29, 1894. Serial No. 527,250. (No model.)

*To all whom it may concern:*

Be it known that I, GEORGE BLAKISTONE, a citizen of the United States, and a resident of Baltimore city, State of Maryland, have invented certain new and useful Improvements in Car-Fenders, of which the following is a specification.

My invention relates to a car fender somewhat similar to the design shown and described in my Letters Patent Nos. 513,701, 513,702 and 513,703.

The object of the improvement set forth in this specification is to provide a means for raising and lowering the wheel fender and tripping the same from the platform of the car, and also to add a front fender extending beyond the platform of the car for the purpose of catching a person who may be in the path of the car and preventing their passing under it. The front fender is combined with the wheel fender in such a manner that when the front fender fails to effect its object of catching the person or thing it will easily ride over it and trip the wheel fender into position to catch the object.

Figure 1:
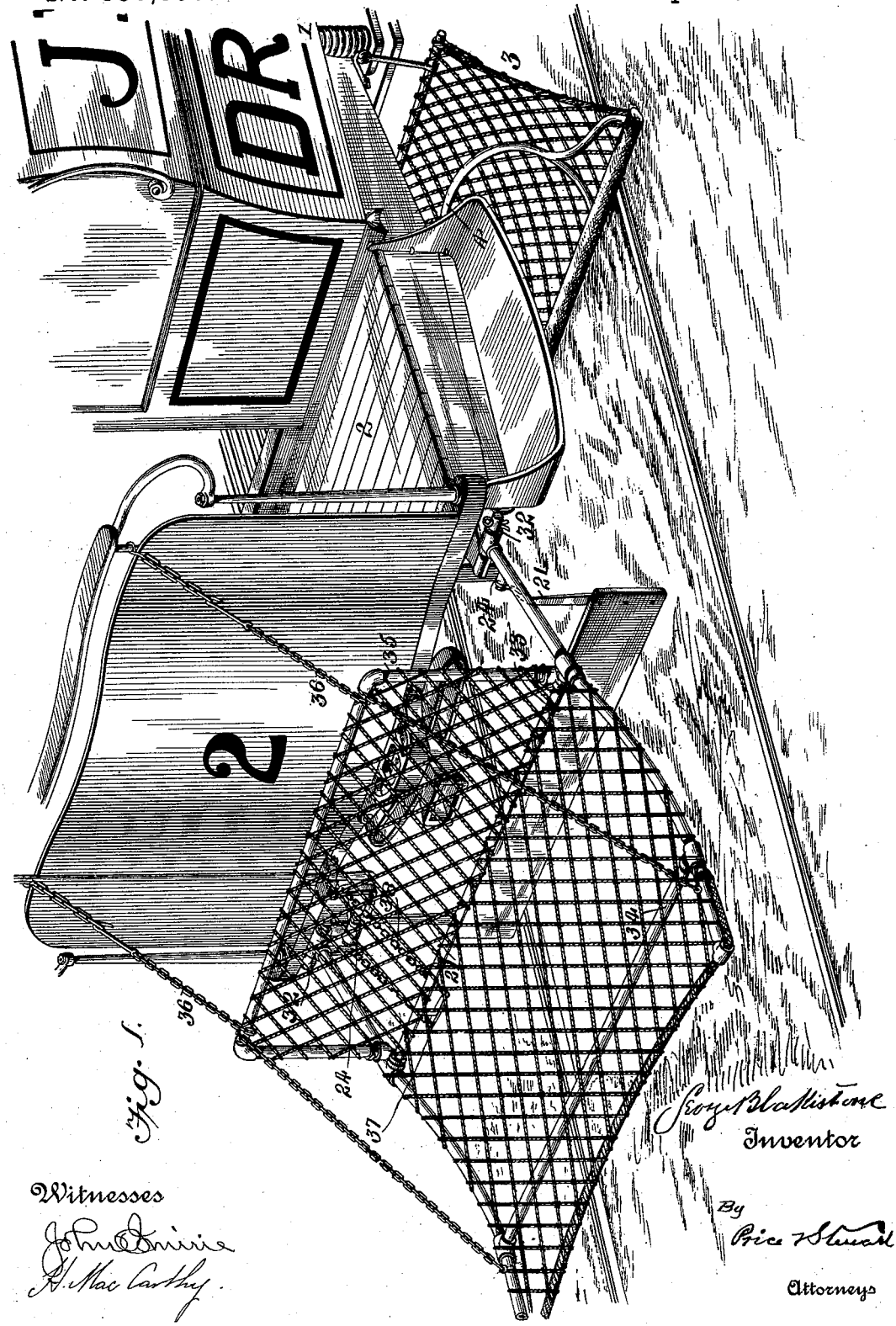
Figure 2:
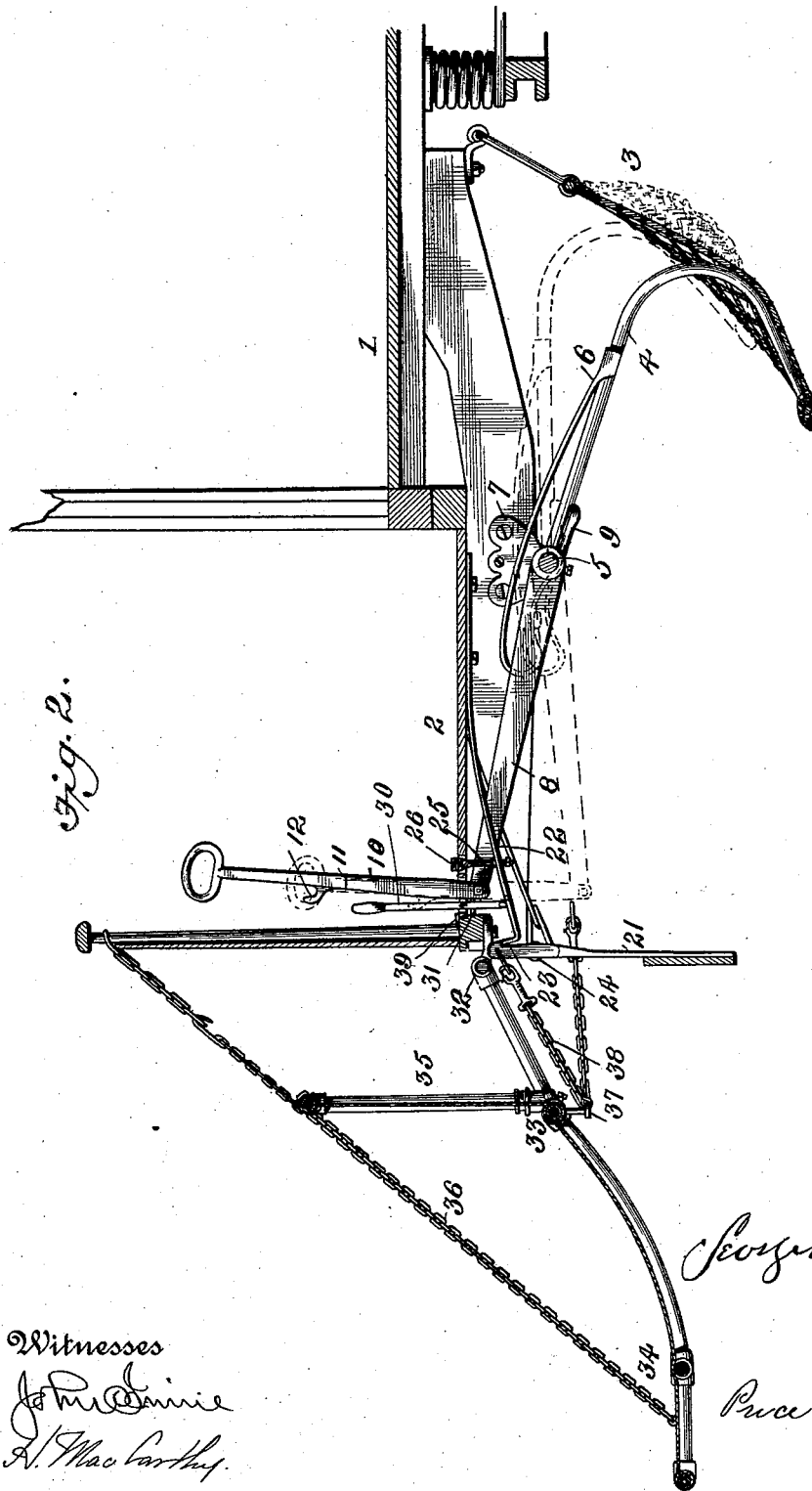

In the drawings, Figure 1 is a perspective view of my fender showing the wheel fender and front fender in position. Fig. 2 is a vertical section of the car showing both fenders in position. Fig. 3 is a plan view of the fender and portions of its attachments, the front part of the front fender being cut away and all of the portions of the tripping device which are above the under side of the car being cut away. Fig. 4 is a detail showing the manner in which the vertical portion of my front fender is supported. Fig. 5 is a perspective view of the tripping device by which the wheel fender is controlled from the platform. Fig. 6 is a perspective view of the tripping device by which the wheel fender is tripped into action by the front fender or by the automatic tripping device. Fig. 7 is a vertical section of the device by which the wheel fender is tripped into action from the platform. Fig. 8 is a vertical section of the device by which the wheel fender is tripped into action by the front fender or by the automatic tripping device. Fig. 9 is a longitudinal section of a portion of the front fender. Fig. 10 is a transverse section of the same.

Referring to Figs. 2 and 3, 1 represents the car body; 2, the front platform. 3 is a flexible net made of any suitable material suspended from the front side of the car in front of the wheel and of sufficient length to reach the ground in an inclined position. 4—4, better shown in Fig. 3, are two hooked-shaped rods pivoted at 5 and having the lower end of the net secured to their lower extremities. These extremities are connected together either by a flexible wire rope or a metal cross bar which may be covered with a soft material. 6—6 are springs by which these levers are pressed down upon the ground so that when the wheel fender is tripped it will bear upon the ground so hard as to prevent its being raised by any object which may be upon the surface of the ground and with which it may come in contact. 7—7 are journals in which the pivot or shaft 5 is mounted. 8 is a lever adjustably set and suitably secured upon the shaft 5 at a desired incline and by which the wheel fender is raised and lowered. The bars 4—4 are loosely journaled upon the shaft 5. 9—9 is a pair of levers fixed upon the shaft 5 by set screws and extending in the opposite direction from the lever 8. They are provided with side projections on their extremities which rest beneath the levers 4—4. The levers 8 and 9 are set by their set screws upon their shaft in such position as to give the lever 8 and the wheel fender suitable play.

Referring to Fig. 2—10 is a bar loosely secured to the end of the lever 8 and extending up through a hole in the platform of the car. It is shown in detail in Fig. 5. It has two notches upon it, one on the face and one on the side. The notches are numbered 11 and 12. Mounted on the platform of the car beside the bar 10 is a device for catching and locking the same. It is shown in detail in Figs. 7 and 8.

Referring to Fig. 7—13 is a frame bolted to the floor of the car, having two vertical projecting pieces 14—14 through which passes a bolt 15 which is surrounded by a spring 16. The end of the bolt 15 is enlarged at 17. The extremity is made beveled so as to form a latch. The spring 16 bears between the portion 17 on the extremity of the bolt 15 and the upwardly projecting piece 14 of the frame 13 which is on the left side, thus forcing the bolt to the right. 18 is a collar and a nut upon the extremity of the bolt 15. 19 is a wedge provided with a slot through which the bolt 15 passes. It bears against the outside of the vertical portion 14 of the frame 13 and the collar 18 and when forced down between them draws the latch 17 backward and releases the lever 10. The wedge 19 is maintained in an elevated position by the spring 20 surrounding its shaft. It has a button on the upper end upon which the foot is placed for pressing it down. The bar 10 has a handle at the top so that it is easily grasped by a motorman. When it is pushed down the wheel fender will be raised, and the catch 17 will engage the lug 11 on the bar 10 and hold the wheel fender in an elevated position. 21 is a suspended lever or pair of levers shown in Fig. 6. Fig. 6, however, is a view of one of said levers only. They differ from one another in that one is straight and the other forked, the tripping mechanism being connected with the latter or forked one. The levers 21—21 are connected together by a bar or frame which extends across the width of the car and stands in the path of any object which may lie on the track. 22 is a spring provided on its extremity with an upward turned portion 23. This spring is bolted to the bottom side of the platform. The levers 21—21 are pivoted at 24 and on their upper ends are provided with a notch which engages with the extremity 23 of the spring 22. 25 is a bar passing through a hole in the spring 22 and up through the platform of the car.

Referring to Fig. 8—26 is a lever pivoted in a bracket 27 on the floor of the platform of the car and connected at one end to the rod 25. The other end is provided with an upwardly curved portion 28 which is so located as to bear upon an inclined side 29 of the collar 18 upon the bolt 15. The upward motion of the spring 22 will cause the lever 26 to be raised and the extremity 28 to be drawn down in contact with the incline 29 of the collar 18, thus drawing the latch 17 out of engagement with the bar 10 and releasing the fender. This is the tripping mechanism by which the wheel fender is automatically tripped when an object comes in contact with the automatic tripping bar 21. To set the automatic tripping bar after the fender has been tripped, the lever 30 is employed. It is pivoted at 31 on the level of the floor of the platform and is made in a bent form as shown in Fig. 8. When raised the lower extremity will bear upon the spring 22 and press it downward until its upwardly projecting extremity 23 is engaged at the notch on the upper end of the lever 21. The lever 30 may then fall back into a horizontal position and be entirely out of the path of the spring 22. The bar 10 is now pushed downward and as it descends the latch 17 will engage the notch 11 and hold the bar in a depressed condition.

Referring now to the front fender, it consists of a frame preferably of metallic pipe made in the form shown in Fig. 2. It is pivoted at 32. It has a straight portion extending to the point 33 where the side bars of the fender are curved downward to the point 34, from which point they project forward in about horizontal position.

35 is a vertical frame pivoted to the cross bar at 33 in the manner shown in vertical section in Figs. 9 and 10, so that when the forward part is lifted, it may be laid together against the dash-board and put out of the way. With this construction the fender will occupy no space in the car house. The frame in the front fender frame, better shown in Fig. 1, has a rope across the front so as to give it softness and elasticity. It is covered with a rope netting or other flexible material. The vertical portion of this frame is also covered with a rope netting but is pivoted to the cross bar 33 of the front fender frame and is maintained in a vertical or other desired angular position by means of the chains 36—36. These chains are the suspensory chains by which the fender is maintained at any desired angle. They are secured on their lower ends near the front ends of the side bars of the front fender, are then wrapped once around the top cross bar of the vertical portion of the fender and then at their upper ends are secured to the dash-board of the car. The loose connection of the vertical portion of the front fender gives to it considerable elasticity. It may be set at any desired incline and a heavy object striking it would not be met with the same shock as would be the case were it rigid.

The automatic mechanism by means of which the wheel fender is tripped into action by the front fender is shown in Figs. 2 and 6. It is designed that when an object is lying on the ground the front fender shall pass over it and it will be picked up by the wheel fender. For this purpose it is very important that the front fender should rise with slight resistance. It is therefore, constructed at its extremity in a horizontal position and is adapted to be raised by a slight pressure. When it rises, however, it must trip the wheel fender and drop it into position to catch the object which has raised the fender. This is done by means of the chain and lever shown in Fig. 6.

37 is a lever pivoted at its center to the cross bar 33 of the front fender. To one end is connected a chain which is secured to a fixed portion of the car body. 38 is a chain connected to the other end of the lever 37 and to the upper end of the lever 21. It will be observed that any upward motion of the front fender will cause the rock-shaft upon the lever 37 to rock in its bearings and will draw upon the chain 38 and pull the upper end of the lever 21 away from the extremity 23 of the spring 22. This will release the spring 22 and cause it to throw the pin 25 upward, together with the lever 26, and release the latch 17 which holds the bar 10, thus releasing the wheel fender.

It will be seen from the foregoing, that a car constructed after this manner will have a number of advantages. There is a provision by which the motorman may throw down the wheel-fender and failing to do so, a person on the track may be caught on the front fender and prevented from getting under the car at all. If both of these fail and the front fender should pass over the body of the party on the track, the front fender would thereby be raised, and this act of raising the front fender trips the wheel fender and drops it. Should all of these fail the party has still another chance, by contact with the frame 21, which is also arranged to trip the wheel fender and trap it in position to catch the body. Thus a person on the track unable to get off in time has a number of chances to escape, that of dropping upon the front fender, the motorman tripping device, the front fender tripping device and the frame 21.

It is sometimes desirable to throw the automatic tripping device entirely out of action. This may be done by raising the lever 30 into the position shown in Fig. 2 and catching it upon a latch or hook 39 shown in Fig. 5. This will keep the spring 22 in a depressed condition and leave the automatic tripping bar 21 to swing backward and forward. If it is desired to lock the wheel fender so as to prevent its action this may be done by hooking the lug 12 on the side of the bar 10 upon the lug 40 on the back of the lever 30. The wheel fender will then be out of action. This is a necessary thing to be done when the car is running away from the fender, that is to say, in a car which is provided with a fender mechanism at each end only the front one of these fenders should be in active position while the car is in operation. It will be observed that this structure may be modified in many particulars, that is to say, the supplemental levers 9—9 may be dispensed with, under certain conditions, and the bars 4—4, carrying the fender, may be rigidly fastened to the shaft 5 at a desired angle. The vertical portion of the front fender may be made rigid if desired, or the side bars may be made straight.

Having thus described my invention, what I claim, and desire to secure by Letters Patent, is—

1. In a car fender the combination of a net of flexible material attached at its rear edge to a suitable part of the car and at its front edge to the rear end of draw-bars which extend forward and are suitably pivoted upon a rock-shaft, said rock-shaft being provided with a forwardly projecting lever by which it may be rocked, and a vertical lever secured to the extremity of the forwardly projecting lever extending upward through the platform of the car, and a catch device consisting of a horizontal bolt surrounded by a spring, and a vertical releasing device consisting of a wedge engaging the bolt and withdrawing the same when pushed down, substantially as described.

2. In a car fender the combination of a net of flexible material attached at its rear edge to a suitable part of the car and at its front edge to the rear end of draw-bars which extend forward and are suitably pivoted upon a rock-shaft, said rock-shaft being provided with a forwardly projecting lever by which it may be rocked and a vertical lever secured to the extremity of the forwardly projecting lever extending upward through the platform of the car and provided with means for catching and holding it in position, and a front fender extending beyond the front portion of the car and pivoted thereto and adapted to rise and fall and provided with means for tripping the wheel fender into action when it rises.

3. In a car fender the combination of a net of flexible material attached at its rear edge to a suitable part of the car and at its front edge to the rear end of draw-bars which extend forward and are suitably pivoted upon a rock shaft, said rock-shaft being provided with a forwardly projecting lever by which it may be rocked and a vertical lever secured to the extremity of the forwardly projecting lever extending upward through the platform of the car and provided with means for catching and holding it in position, and a front fender extending beyond the front portion of the car and pivoted thereto and adapted to rise and fall, and provided with a chain connected to the tripping mechanism of the wheel fender whereby the wheel fender will be tripped into action when the front fender is raised.

4. In a car fender device the combination with a pivoted frame projecting in front of the car and provided with a flexible net, of a second frame pivoted to the first, provided with a net and standing approximately vertical when in use, a chain or cord whose outer end is secured to the front frame and passing around a suitable part of the second frame is attached at its other end to a suitable part of the car, whereby a resiliency of movement between the frames is attained.

5. In a car fender the combination of a forward fender and suspended wheel fender with a tripping device for the wheel fender provided with three separate actuating devices one consisting of a bar passing through the platform of the car and under the control of the motor-man, another connected to the front fender and operated by the rise of the front fender to trip and drop the back fender, and a third consisting of a dependent frame located in the rear of the front fender and under the car close to the ground and connected to the tripping device of the wheel fender whereby said tripping device will be automatically operated when the dependent frame is struck by an object on the ground, substantially as described.

Signed at Baltimore city, in the State of Maryland, this 23d day of October, A. D. 1894.

GEORGE BLAKISTONE.

Witnesses:
HENRY R. DULANY,
H. MACCARTHY.